United States Patent
Wang et al.

(10) Patent No.: US 8,958,349 B2
(45) Date of Patent: Feb. 17, 2015

(54) METHOD AND APPARATUS FOR DYNAMIC CHANGE OF THE TDD UL/DL CONFIGURATION IN LTE SYSTEMS

(71) Applicant: BlackBerry Limited, Waterloo (CA)

(72) Inventors: Yiping Wang, Allen, TX (US); Andrew Mark Earnshaw, Kanata (CA); Jun Li, Richardson, TN (US)

(73) Assignee: BlackBerry Limited, Waterloo, Ontario (CA)

( * ) Notice: Subject to any disclaimer, the term of this patent is extended or adjusted under 35 U.S.C. 154(b) by 182 days.

(21) Appl. No.: 13/660,570

(22) Filed: Oct. 25, 2012

(65) Prior Publication Data

US 2014/0119261 A1     May 1, 2014

(51) Int. Cl.
    *H04J 3/00*     (2006.01)
    *H04W 72/04*     (2009.01)
    *H04L 12/24*     (2006.01)

(52) U.S. Cl.
    CPC ............ *H04W 72/04* (2013.01); *H04L 41/0806* (2013.01)
    USPC .......................................... 370/280; 370/312

(58) Field of Classification Search
    CPC .................................. H04W 72/04; H04L 1/16
    USPC ................................................. 370/312, 329
    See application file for complete search history.

(56) References Cited

U.S. PATENT DOCUMENTS

2008/0153429 A1*   6/2008   Johnson et al. .................. 455/72
2012/0300715 A1*   11/2012   Pelletier et al. ................ 370/329
2013/0064190 A1*   3/2013   Hariharan et al. ............. 370/329
2013/0070685 A1*   3/2013   Yi et al. .......................... 370/328
2013/0272170 A1*   10/2013   Chatterjee et al. ............ 370/280
2014/0126520 A1*   5/2014   Quan et al. ..................... 370/329

OTHER PUBLICATIONS

3GPP TS 36.211 V11.0.0; 3rd Generation Partnership Project; Technical Specification Group Radio Access Network; Evolved Universal Terrestrial Radio Access (E-UTRA); Physical Channels and Modulation; Release 11; Sep. 2012; 106 pages.

3GPP TS 36.212 V11.0.0; 3rd Generation Partnership Project; Technical Specification Group Radio Access Network; Evolved Universal Terrestrial Radio Access (E-UTRA); Multiplexing and Channel Coding; Release 11; Sep. 2012; 79 pages.

3GPP TS 36.331 V11.0.0; 3rd Generation Partnership Project; Technical Specification Group Radio Access Network; Evolved Universal Terrestrial Radio Access (E-UTRA); Radio Resource Control (RRC); Release 11; Sep. 2012; 325 pages.

3GPP TSG-RAN Meeting #51; "New Study Item Proposal for Further Enhancements to LTE TDD for DL-UL Interference Management and Traffic Adaptation"; RP-110450; Kansas City, USA; Mar. 15-18, 2010; 6 pages.

3GPP TSG-RAN WG1 #69; "On Standardization Impact of TDD UL-DL Adaptation"; R1-122016; Prague, Czech Republic; May 21-25, 2012; 3 pages.

(Continued)

*Primary Examiner* — Gary Mui

(74) *Attorney, Agent, or Firm* — Conley Rose, P.C.; J. Robert Brown, Jr.

(57) ABSTRACT

A method is provided for communication in a wireless telecommunication system. The method comprises transmitting, by a network element, in at least one of a MAC-based component or a DCI-based component, information regarding a configuration of uplink subframes and downlink subframes in a radio frame.

31 Claims, 8 Drawing Sheets

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| Group One | | | | | | | | | | | |
| 0 | 5 ms | D | S | U | U | U | D | S | U | U | U |
| 6 | 5 ms | D | S | U | U | U | D | S | U | U | D |
| 1 | 5 ms | D | S | U | U | D | D | S | U | U | D |
| 2 | 5 ms | D | S | U | D | D | D | S | U | D | D |
| Group Two | | | | | | | | | | | |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |

(56) References Cited

OTHER PUBLICATIONS

Related Application: U.S. Appl. No. 13/210,033, filed Aug. 15, 2011.
Related Application: U.S. Appl. No. 13/210,066, filed Aug. 15, 2011.
PCT International Search Report; Application No. PCT/US2013/066394; Jan. 7, 2014; 4 pages.
PCT Written Opinion of the International Searching Authority; Application No. PCT/US2013/066394; Jan. 7, 2014; 7 pages.
3GPP TSG RAN WG1 Meeting #69; "Dynamic Reconfiguration of TDD UL-DL Configuration"; R1-122267; Prague, Czech Republic; May 21-25, 2012; 2 pages.
3GPP TSG RAN WG1 Meeting #69; "Methods to Support Different Time Scales for TDD UL-DL Reconfiguration"; R1-122508; Prague, Czech Republic; May 21-25, 2012; 2 pages.
3GPP TSG RAN WG1 Meeting #69; "TDD DL-UL Reconfiguration Methods for eIMTA"; R1-122318; Prague, Czech Republic; May 21-25, 2012; 5 pages.
3GPP TSG-RAN WG1 Meeting #69; "Discussion on Enhancements for Dynamic TDD UL-DL Configuration"; R1-122363; Prague, Czech Republic; May 21-25, 2012; 4 pages.
3GPP TSG RAN WG1 Meeting #72; "TDD UL/DL Reconfiguration Signalling Methods"; R1-131353; Chicago, USA; Apr. 15-19, 2013; 4 pages.

* cited by examiner

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

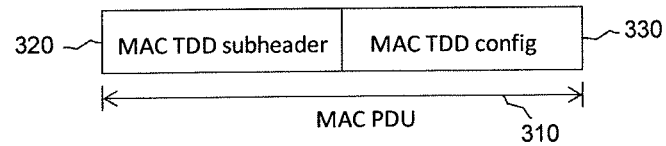
Figure 3
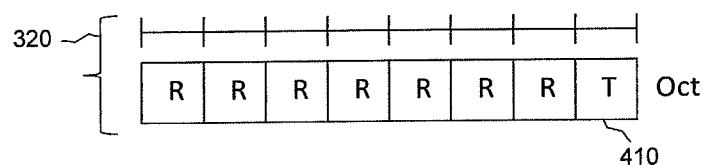
Figure 4
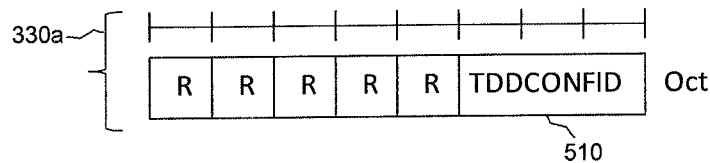
Figure 5
| UL/DL Configuration | TDDCONFID |
|---|---|
| 0 | 000 |
| 1 | 001 |
| 2 | 010 |
| 3 | 011 |
| 4 | 100 |
| 5 | 101 |
| 6 | 110 |
| Reserved | 111 |
Figure 6

| Uplink-Downlink Configuration | Downlink-to-Uplink Switch-Point Periodicity | Subframe Number ||||||||||
|---|---|---|---|---|---|---|---|---|---|---|---|
| | | 0 | 1 | 2 | 3 | 4 | 5 | 6 | 7 | 8 | 9 |
| Group One | | | | | | | | | | | |
| 0 | 5 ms | D | S | U | U | U | D | S | U | U | U |
| 6 | 5 ms | D | S | U | U | U | D | S | U | U | D |
| 1 | 5 ms | D | S | U | U | D | D | S | U | U | D |
| 2 | 5 ms | D | S | U | D | D | D | S | U | D | D |
| Group Two | | | | | | | | | | | |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |

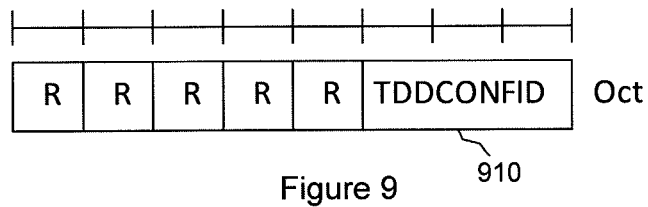
Figure 9
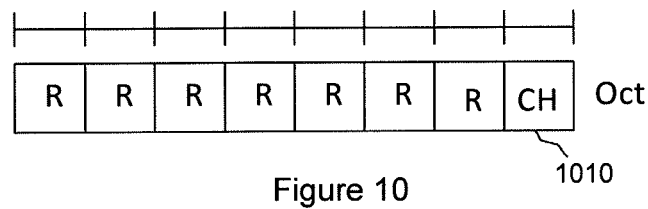
Figure 10
| Bandwidth (MHz) | 1.4 | 3 | 5 | 10 | 15 | 20 |
|---|---|---|---|---|---|---|
| DCI format 0/1A length (bit) | 21 | 22 | 25 | 27 | 27 | 28 |
| DCI format 1C length (bit) | 9 | 11 | 13 | 13 | 14 | 15 |
Figure 11

METHOD AND APPARATUS FOR DYNAMIC CHANGE OF THE TDD UL/DL CONFIGURATION IN LTE SYSTEMS

FIELD OF THE DISCLOSURE

The present disclosure relates to control channels in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node or a network element.

LTE may be said to correspond to Third Generation Partnership Project (3GPP) Release 8 (Rel-8 or R8) and Release 9 (Rel-9 or R9), and possibly also to releases beyond Release 9, while LTE Advanced (LTE-A) may be said to correspond to Release 10 (Rel-10 or R10) and possibly also to Release 11 (Rel-11 or R11) and other releases beyond Release 10. As used herein, the terms "legacy", "legacy UE", and the like might refer to signals, UEs, and/or other entities that comply with LTE Release 10 and/or earlier releases but do not fully comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates a medium access control (MAC) protocol data unit for dynamic TDD reconfiguration according to an embodiment of the disclosure.

FIG. 4 illustrates a MAC sub-header according to an embodiment of the disclosure.

FIG. 5 illustrates a MAC protocol data unit configuration for a direct index according to an embodiment of the disclosure.

FIG. 6 is a table mapping an index to an uplink/downlink configuration according to an embodiment of the disclosure.

FIG. 9 illustrates a MAC control element configuration for a direct index according to an embodiment of the disclosure.

FIG. 10 illustrates a MAC control element configuration for a relative change according to an embodiment of the disclosure.

FIG. 11 is a table of DCI format 0/1A and 1C payload lengths according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

Figures 1, 2:
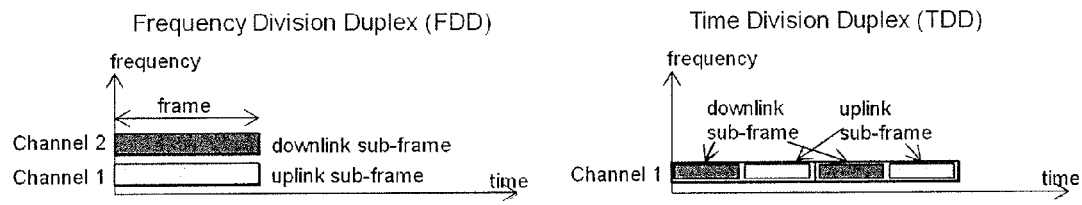
FIG. 1 is a diagram of frequency division duplex and time division duplex modes.
FIG. 2 is a table showing LTE time division duplex uplink/downlink configurations.

In an LTE system, downlink and uplink transmissions are organized into one of two duplex modes, frequency division duplex (FDD) mode and time division duplex (TDD) mode. The FDD mode uses paired spectrum where the frequency domain is used to separate the uplink (UL) and downlink (DL) transmissions. In TDD systems, on the other hand, unpaired spectrum is used where both UL and DL are transmitted over the same carrier frequency. The UL and DL are separated in the time domain. FIG. 1 illustrates both duplex modes.

In a 3GPP LTE TDD system, a subframe of a radio frame can be a downlink, uplink, or special subframe. A special subframe comprises downlink and uplink time regions separated by a guard period for downlink to uplink switching. 3GPP Technical Specification (TS) 36.211 defines seven different UL/DL configuration schemes in LTE TDD operations. The schemes are listed in FIG. 2, where D represents a downlink subframe, U represents an uplink subframe, and S represents a special subframe. A special subframe includes three parts: the downlink pilot time slot (DwPTS), the uplink pilot time slot (UpPTS), and the guard period (GP). Downlink transmissions on the physical downlink shared channel (PDSCH) may be made in DL subframes or in the DwPTS portion of a special subframe.

As FIG. 2 shows, there are two switching point periodicities specified in the LTE standard, 5 milliseconds (ms) and 10 ms. 5 ms switching point periodicity is introduced to support co-existence between LTE and low chip rate UTRA TDD systems, and 10 ms switching point periodicity is for coexistence between LTE and high chip rate UTRA TDD systems. The supported configurations cover a wide range of UL/DL allocations from a DL-heavy 1:9 ratio to a UL-heavy 3:2 ratio. The DL allocations in these ratios include both DL subframes and special subframes, which can carry downlink transmissions in the DwPTS.

Compared to FDD, TDD systems have more flexibility in terms of the proportion of resources assignable to uplink and downlink communications within a given assignment of spectrum. Specifically, it is possible to distribute the radio resources unevenly between the uplink and the downlink. Such a distribution may allow the radio resources to be utilized efficiently through the selection of an appropriate UL/DL configuration based on the interference situation and different traffic characteristics in the DL and the UL. Although these allocations can provide between 40% and 90% DL subframes, a semi-static UL/DL allocation may not match the instantaneous traffic situation. This is especially true in small cell deployments where the number of UEs in the cell is small.

In the current LTE specification, the TDD UL/DL configuration is provided to UEs via the System Information Block Type1 (SIB1) message. SIB1 is delivered to UEs every 80 ms. This means that the maximum frequency at which the UL/DL configuration could be changed is every 80 ms. However, the system information modification period defined in the current specification will further limit the configuration change frequency. The eNB pages all UEs in the cell to provide a system information update in the next modification period, and the minimum allowable system information change periodicity is 640 ms. In addition, since the eNB typically must page UEs with a system information modification period during the entire modification period preceding the modification period boundary where system information is changed, there is a minimum 640 ms time lag (equal to the modification period length) between the time an eNB decides it wants to alter the UL/DL configuration and the time the new UL/DL configuration can actually be broadcast in a revised SIB1.

That is, the first transmission of SIB1 may be scheduled in subframe 5 of radio frames for which the system frame number (SFN) mod 8=0, and hybrid automatic repeat request (HARQ) repetitions may be scheduled in subframe 5 of all other radio frames for which SFN mod 2=0. Therefore, the frequency of TDD configuration change would not be more than once every 80 ms if only the SIB1 transmission periodicity is considered. Furthermore, the current version of the LTE specification does not require UEs to read every repetition of SIB1, as this would have implications on UE power consumption. 3GPP TS 36.331 specifies that the system information content can change only at modification period boundaries. A modification period is a large multiple of the SIB1 repetition period, and the minimum possible value is 640 ms.

For applications with a fast packet arrival time and/or a large packet size, such as network gaming or peer-to-peer communications, the traffic intensity may change rapidly between UL and DL. A fixed UL/DL configuration may lead to inefficient use of system radio resources in these kinds of traffic characteristics. That is, when application traffic intensity alters rapidly between UL and DL, the system radio resource allocation may not be able to follow the traffic pattern change to efficiently accommodate the application traffic needs. Therefore, there may be a need to develop a TDD UL/DL configuration method that allows changes to be made rapidly to UL/DL configuration information.

Embodiments of the present disclosure provide at least four methods for providing UL/DL configuration information to UEs more frequently than is possible when the configuration information is included in SIB1. The first and second methods are based on the medium access control layer. The third and fourth methods are physical layer approaches based on downlink control information. The methods may be used independently of one another or in various combinations with one another. Each of the methods will now be considered in turn.

In the first method, a new medium access control (MAC) protocol data unit (PDU) for TDD UL/DL reconfiguration is defined. The MAC PDU may be sent in a broadcast manner using a new shared radio network temporary identifier (RNTI) that advanced UEs may search for in the common search space of the physical downlink control channel (PDCCH). The new RNTI may be referred to as the TDDconfig-RNTI. A transport block cyclic redundancy check (CRC) may provide error protection. The MAC PDU may be transmitted only in certain subframes to minimize any additional blind decoding of PDCCHs by the UEs. The subframes in which the MAC PDU is transmitted may be in either a fixed pattern or a configurable pattern known to the UEs.

The new MAC PDU may be transparent and may consist of only a MAC service data unit (SDU) for reconfiguring a TDD UL/DL allocation. The corresponding transport channel may be referred to as the TDDReCCH. This new transport channel may be defined such that a negative acknowledgement (NACK) is sent for an incorrect reception, but an acknowledgement (ACK) is not sent for a correct reception. The downlink control information (DCI) length may be the same as for existing format 0/1A or 1C, which may reduce the blind decoding computational effort, since UEs are already mandated to search for DCIs of this length. The DCI may point to a resource where this MAC PDU for TDD UL/DL reconfiguration can be detected.

Given that the minimum transport block size is 16 bits, an embodiment of such a MAC PDU is shown in FIG. 3. The 16-bit MAC PDU 310 consists of an 8-bit MAC TDD sub-header 320 and an 8-bit MAC TDD config payload 330. An appended 24-bit transport block CRC may provide error protection. The sub-header 320 includes a type field specifying a type of configuration indicator, either direct or relative, in the payload 330. The payload 330 includes a direct indicator or a relative indicator specifying a new UL/DL configuration.

The MAC TDD sub-header 320 is illustrated in FIG. 4 with a one-bit type field 410, T, which indicates the type of signal in the MAC TDD config payload 330. The T field 410 may be set to "0", for example, to indicate that the signal in the MAC TDD config payload 330 directly indexes to the TDD UL/DL configuration. The T field 410 may be set to "1", for example, to indicate that the signal in the MAC TDD config payload 330 represents a relative change of the TDD UL/DL configuration based on the current configuration. R is a reserved bit and may be set to "0".

FIG. 5 shows a MAC TDD config payload 330*a* for the direct index case. A three-bit field 510, TDDCONFID, directly indicates one of the seven TDD UL/DL configurations in FIG. 2 to which the current configuration is to be changed. R is a reserved bit and may be set to "0". The table in FIG. 6 shows an embodiment of a possible mapping between the field 510 and the UL/DL configuration.

Figures 7, 8:
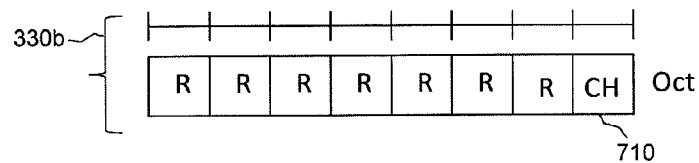
FIG. 7 illustrates a MAC protocol data unit configuration for a relative change according to an embodiment of the disclosure.
FIG. 8 is a table of uplink/downlink configuration groups according to an embodiment of the disclosure.

FIG. 7 shows a MAC TDD config payload 330*b* for a relative TDD UL/DL configuration change based on the current configuration. A change field 710, CH, is a single bit. The field may be set to "0" or "1" to indicate either a one-row upward movement or a one-row downward movement in the TDD UL/DL configuration table shown in FIG. 2. R is a reserved bit and may be set to "0".

Alternatively, the seven UL/DL configurations may be divided into two groups in terms of downlink-to-uplink switch-point periodicity, as shown in the table in FIG. 8. A first group 810 is the 5 ms group, and a second group 820 is the 10 ms group. The CH field 710 may be used to indicate an upward movement or a downward movement within one of the groups 810 or 820.

If an upward movement is indicated and the current position within the group is already at the beginning of the group, then no adjustment to the position within the group is made. Similarly, if a downward movement is indicated and the current position within the group is already at the end of the group, then no adjustment to the position within the group is made.

At least three techniques may be used to increase the robustness of this first method. In a first technique, an eNB may transmit the TDD reconfiguration MAC PDU with a low modulation and coding scheme (MCS) to improve the probability of successful decoding. Transmission in this manner is likely to be the case anyway since fitting a 16-bit transport block into a single resource block for transmission may require the use of the lowest possible MCS. Alternatively, a high MCS may be used, and the coded block may be repeated for a number of times afterward.

In a second technique for increasing the robustness of the first method, if a UE does not correctly decode the reconfiguration MAC PDU after detecting the PDCCH with the TDDconfig-RNTI, the UE may send a NACK back to the eNB asking for further retransmission. UEs that correctly decode the MAC PDU may not transmit an ACK. If the eNB detects a NACK from any UE, the eNB may retransmit the reconfiguration MAC PDU. In some embodiments, all NACKs are transmitted on the same physical uplink control channel (PUCCH) resource, which is implicitly conveyed by the same PDCCH. Because an ACK is not transmitted, on-off keying detection may determine if retransmission is needed or not. Alternatively, it is also possible to use a PUCCH resource indication explicitly to send a NACK on separate PUCCH resources.

In a third technique for increasing the robustness of the first method, the TDD reconfiguration MAC PDU may be repeatedly transmitted (e.g., with HARQ redundancy versions) without feedback with a fixed pattern or with a configurable pattern conveyed to the UEs via higher layer signaling. UEs unable to correctly decode the MAC PDU on the first transmission can then use HARQ combining of further retransmissions in order to increase the probability of a successful decoding. This approach may also be useful to UEs in the discontinuous reception (DRX) state since such UEs may receive the new configuration information when they wake up. For the relative change scheme shown in FIG. 7, a predefined TDD reconfiguration period may need to be in place such that a UE can discard the repeated command after correctly decoding the previous transmission of the MAC PDU within the period. Alternatively, after correctly decoding the MAC PDU, a UE can ignore any further HARQ retransmission if the new data indicator (NDI) flag has not toggled. A retransmission may be indicated by the NDI flag in the DL assignment in the usual manner. That is, the NDI value may remain the same for a retransmission or may toggle for a new data transmission. Another alternative is to introduce parameters in a radio resource control (RRC) message, for example within the mac-MainConfig information element, to control the retransmission of the TDD reconfiguration MAC PDU. Since the DCI length of the TDDconfig-RNTI is chosen to be the same as for format 0/1A or 1C, it may not be necessary to purposely avoid transmitting a TDD reconfiguration signal and system information and paging at the same time.

Additionally, to further minimize any extra processing effort by the UEs, the reconfiguration MAC PDU may be limited to being transmitted only in certain subframes. For example, the reconfiguration MAC PDU may be transmitted in subframes #0 and/or #5, which are always in the DL direction. The subframes in which the reconfiguration MAC PDU is transmitted may have either a fixed pattern or a configurable pattern conveyed via higher layer signaling.

Since this first method is a broadcast approach in nature, it may be suitable for use in scenarios where there are a large number of UEs in a cell. Hence, this method may be more applicable for reconfigurations that are due to interference.

In the first method, the reconfiguration MAC PDU is broadcast throughout a cell and is not multiplexed with any other data. The second method is also MAC-based, but the UL/DL reconfiguration information is placed in a MAC control element (CE) rather than in a MAC PDU. A logical channel ID may be assigned to the MAC CE to identify the MAC CE. The MAC CE may then be multiplexed with other MAC layer SDUs and transmitted to a specific UE rather than being broadcast throughout a cell.

More specifically, in the second method, a new logical channel ID (LCID) is defined to identify a TDD UL/DL reconfiguration MAC CE sub-header. One of the 5-bit LCIDs from a reserved pool, for example 11010, may be used for this purpose. The payload for a TDD UL/DL reconfiguration MAC CE may be one byte and may be in the form of a direct index, as shown in FIG. 9, or a relative TDD UL/DL configuration change based on the current configuration, as shown in FIG. 10. As with the MAC PDU-based method, the field TDDCONFID 910 in FIG. 9 directly indicates one of the seven TDD UL/DL configurations in the table in FIG. 6 to which the configuration is changing. The CH field 1010 in FIG. 10 indicates an upward movement or a downward movement in the table of FIG. 2 or within one of the groups 810 or 820 in the table of FIG. 8 relative to the current TDD UL/DL configuration.

Since the TDD UL/DL reconfiguration MAC CE is UE-specific, the MAC CE may need to be sent to every UE in the cell. Therefore, this second method may be more applicable in a small cell scenario where the number of UEs per cell is low. Moreover, traffic adaptation may be more useful in the case of a small number of UEs per cell.

The TDD UL/DL reconfiguration MAC CE may be multiplexed with other MAC CEs and other MAC SDUs and then transmitted on the physical downlink shared channel (PDSCH). If there is no other DL data to transmit to a particular UE, the eNB may transmit the TDD UL/DL reconfiguration MAC CE in a stand-alone MAC PDU to that UE.

Similarly to the first method, robustness may be improved through the use of a fixed, configurable, or arbitrary number of HARQ retransmissions, which a UE can combine if necessary. The eNB may be able to hold off a configuration change until receiving ACKs from all the UEs in the cell. This can be implemented by pre-defining the reconfiguration period, which allows a number of HARQ retransmissions during this period. All UEs may be targeted to change the UL/DL configuration at the same time. However, if one or more UEs missed the detection reconfiguration command, UE-specific RRC reconfiguration signaling may be triggered to indicate the new configuration.

The first two methods for providing UL/DL configuration information used the MAC layer for transmitting the information. The third and fourth methods are physical layer-based approaches and, more specifically, DCI-based approaches.

In the third method, a one-bit TDD index may be inserted in any of the existing DCI formats, as defined in 3GPP TS 36.212, to indicate the TDD UL/DL configuration moving up or down in a configuration table. Alternatively, a three-bit field may be inserted to directly indicate the TDD UL/DL configuration. The reconfiguration may be signaled whenever there is an opportunity to send a DL assignment to a UE.

More specifically, in an embodiment of this third method, a TDD reconfiguration field to represent a TDD configuration change may be inserted into all or some of the formats of DCI. The TDD reconfiguration field may be a single bit that indicates whether the TDD UL/DL configuration should move up or down in terms of the UL/DL ratio. For instance, "0" in the TDD reconfiguration field may represent an upward movement and "1" in the TDD reconfiguration field may represent a downward movement in the TDD UL/DL configuration tables of FIG. 2 or FIG. 8.

With this scheme, the reconfiguration period may need to be defined via higher layer signaling so that UEs are able to correctly interpret the TDD reconfiguration signal. For instance, if the reconfiguration is set at the rate of every radio frame (e.g., every 10 ms), the available reconfiguration commands that the UE receives during the radio frame can be accumulated, for example by mapping a bit value of "0" to +1 and a bit value of "1" to −1. The reconfiguration may then happen at every radio frame boundary. In this way, robustness is improved since the UE can compare multiple accumulated reconfiguration commands against a threshold. If the accumulated value is strictly positive, then the UE moves up in the TDD UL/DL configuration list. If the accumulated value is a strictly negative number, then the UE moves down in the TDD UL/DL configuration list.

In all of the above cases, if an upward movement is indicated and the current position within the TDD UL/DL configuration list is already at the top of the list, then no adjustment to the list position is made. Similarly, if a downward movement is indicated and the current position within the TDD UL/DL configuration list is already at the bottom of the list, then no adjustment to the list position is made.

In an alternative embodiment of the third method, the TDD reconfiguration field may be three bits long to directly indicate the TDD UL/DL configuration. The mapping table in FIG. 6 can be used for this purpose. With this scheme, since the TDD UL/DL configuration is directly signaled, it is theoretically not necessary to define the reconfiguration period as in the relative change embodiment of this third method. However, to improve robustness, the reconfiguration period may still be pre-set via higher layer signaling such that all the reconfiguration commands received during the period can be accumulated. Moreover, better performance may be possible if every active UE reconfigures at the same time.

In a system designed for all advanced UEs, the TDD reconfiguration field may be added to all DCI formats, including DCI formats in the common search space. In this way, there is no possibility of DCI length confusion due to the addition of the TDD reconfiguration field. Every UE in an active period can be provided with a possible new TDD UL/DL configuration. In a system designed for backward compatibility with legacy UEs, the TDD reconfiguration field may be added only into UE-specific DCIs, such as DCI 0/1/1A/1B/1D/2/2A/2B/2C/4. In this case, DCI length confusion still may not occur since DCI format 1C/3/3A is usually applied with a different RNTI than the rest of the DCI formats.

The eNB may know the capabilities of the UEs and may use DCIs with a UL/DL reconfiguration field for advanced UEs and may use Rel 8/9/10 DCIs for legacy UEs. Advanced UEs may be able to be informed of a new TDD UL/DL configuration as fast as every DL subframe. Legacy UEs may still follow the existing system information modification period to update the TDD UL/DL configuration.

The fourth method introduces a new DCI format that is transmitted on the common search space of a control region where advanced UEs will search. The new DCI format may be differentiated based on a new RNTI value, and the new RNTI may be used to scramble the CRC for purposes of the search. To reduce the computational impact, the same DCI length may be used as is used for DCI 0/1A or 1C, for which UEs already search.

The length of a DCI 0/1A payload is shown in the table in FIG. 11. If a three-bit representation of the TDD UL/DL configuration is considered, then in an embodiment, a fixed rate encoder may be used. The three bits may be encoded into a 21-bit code word with error correction capability. For higher bandwidth, padding bits may be added to make the length equal to that in DCI format 0/1A. Alternatively, a variable rate encoder may be used to make a lower code rate for better error correction at higher bandwidth.

In another embodiment, the same DCI length as for DCI 1C can be used, as shown in FIG. 11, since UEs already search for that DCI format in the common search space.

Instead of using a new RNTI, it is possible to re-use the paging RNTI (P-RNTI) for TDD reconfiguration purposes. Paging is transmitted only at certain predefined radio frames and subframes. In an embodiment, the TDD reconfiguration signal is limited to being transmitted only during non-paging subframes. In this case, the P-RNTI can be re-used for identifying the TDD reconfiguration PDCCH.

To improve robustness, the same PDCCH may be sent over several different subframes before the actual reconfiguration to improve the probability that each UE will correctly detect the PDCCH at least once. This may guard against PDCCH misdetections, where a UE fails to detect a PDCCH that is actually there since a UE only needs to be successful in decoding at least one of the multiple transmitted PDCCHs in order to know that a UL/DL reconfiguration will occur. This repetition may occur at a fixed interval or in a configurable pattern.

The third method or fourth method may be used as a complementary method to the first method or second method to solve issues that may arise when a UE wakes up from a DRX state. The DCI-based approaches of the third and fourth methods may be faster than the MAC-based approaches of the first and second methods but may consume more control channel capacity than the MAC-based approaches. To conserve control channel capacity, it may be desirable to use a MAC-based method at most times. However, providing UL/DL configuration information to a UE as soon as possible after the UE wakes up from a DRX state may also be desirable. A DCI-based approach may provide the information to such a UE sooner than would a MAC-based approach. In an embodiment, a DCI-based method is used when UL/DL configuration information is transmitted to a UE within a pre-specified time after the UE has awoken from a DRX sleep period. A MAC-based method may be used at other times.

The system impact of dynamic TDD UL/DL reconfiguration, including issues with reference signals, control signals, and backward compatibility, will now be considered.

Regarding UL sounding reference signal (SRS) measurement, SRS is primarily transmitted at one or both symbols in the UpPTS for a TDD LTE system. This need not change as the TDD UL/DL configuration changes since the eNB typically knows where to detect sounding reference signals, and the UpPTS location would remain constant. Alternatively, the eNB can configure a UE's SRS transmissions to occur in subframes that remain UL subframes regardless of how the UL/DL configuration changes. For example, the subframe immediately after a special subframe is always an uplink subframe, and the position and number of special subframes is unlikely to change with a UL/DL reconfiguration.

Regarding DL cell reference symbol (CRS) measurement, there may be issues associated with a TDD UL/DL reconfiguration due to a potential misunderstanding of the configuration between the eNB and the UEs. For example, if the eNB changes a UL/DL configuration, some DL subframes may be changed to UL subframes. However, a UE may not have decoded the reconfiguration for some reason and may still treat those subframes as DL subframes. This may lead to inaccurate measurement and cause more frequent radio link failure, false handover, and/or an artificially low channel quality indicator (CQI). Therefore, the eNB may need to leave enough lead time, i.e., the duration from the time when the eNB sends the reconfiguration command to the time when the reconfiguration actually happens, for UEs to correctly receive the reconfiguration command. This lead time can be semi-statically configured by higher layer signaling depending on the method used for reconfiguration.

Regarding backward compatibility with legacy UEs, because legacy UEs rely on a system information change notification from paging messages or a system information value tag in SIB1 to determine when to update the UL/DL configuration according to a relatively long modification period (640 ms or longer), there may be a direction mismatch between UL and DL during some subframes if a faster reconfiguration method is used. In an embodiment, such a mismatch may be avoided by performing downlink measurements only on fixed DL direction subframes, i.e., #0, #1, #5, and #6. Such an embodiment may limit the reporting frequency. Alternatively, the change may be limited within a group, as shown in the table in FIG. 8. For the second group 820, the fixed DL subframes would be #0, #1, #5, #6, #7, #8, and #9. This alternative would alleviate the reporting frequency limitation.

Another option for achieving backward compatibility is to configure subframes that may change between UL and DL as multicast/broadcast single frequency network (MBSFN) subframes so that legacy UEs will mainly avoid basing measurements on those subframes. MBSFN subframes transmit normal reference symbols only in the first one or two orthogonal frequency division multiplexing (OFDM) symbols, depending upon the number of transmission antennas at the eNB. Consequently, a UE might ignore MBSFN subframes for measurement purposes or might at least limit measurement to the first one or two OFDM symbols since reference symbols can be assumed to be absent in the remainder of the MBSFN subframe.

Any of these options may prevent legacy UEs from making downlink measurements on subframes that have been reconfigured as UL subframes and have no DL transmissions occurring in them on which downlink measurements could be based.

It should also be noted that a legacy UE may not expect to receive downlink PDSCH transmissions in an MBSFN subframe. When such a subframe is configured as a DL subframe, the eNB can transmit downlink traffic to the legacy UE in other non-MBSFN-configured subframes. When such a subframe is configured as a UL subframe, then no downlink PDSCH transmissions are possible anyway.

UEs can make uplink PUSCH transmissions in an MBSFN subframe. Uplink operation may thus proceed as described elsewhere herein. That is, uplink PUSCH transmissions are under the scheduling control of the eNB, so the eNB can schedule PUSCH transmissions in subframes configured as UL subframes, and can avoid scheduling PUSCH transmissions in subframes configured as DL subframes.

As mentioned above, a change of a TDD UL/DL configuration may be slow for legacy UEs compared to the speed of reconfiguration for advanced UEs when the methods disclosed herein are used. This may cause interference issues for inter-release UEs (UEs that are between advanced UEs and legacy UEs), especially when the inter-release UEs are located close to each other. In an embodiment, to avoid such interference issues, the eNB may not grant any UL transmission for legacy UEs in subframes that may vary between UL and DL in a dynamic reconfiguration. The eNB may also purposely terminate any ongoing non-adaptive UL HARQ retransmissions by sending an ACK to legacy UEs even if the eNB was not able to decode the UL transmission. Adaptive UL HARQ retransmissions can be used in these situations. For example, if the current configuration is 0 and a change is made to configuration 6, the eNB should deny any UL grant at subframe 9 in subsequent frames.

However, some control signals, such as channel state information (CSI) and ACK/NACK, cannot be stopped. If there is no data transmission (UL grant denied), this PUCCH-only transmission by legacy UEs may be placed at the frequency edges of the bandwidth. At these frequency edges, only those subframes with a change between UL and DL will cause an interference issue. The number of such subframes is expected to be limited, so the eNB may be able to avoid scheduling the nearby advanced UEs at the frequency edges at the time of a subframe in which a change between UL and DL occurs. In addition, it may be possible to assign CSI reporting configurations to legacy UEs such that the UEs report in subframes that are always configured as UL subframes even if the UL/DL configuration varies dynamically.

A UE in an idle or DRX period may not receive TDD UL/DL reconfiguration information sent by an eNB. Idle UEs can get the latest TDD UL/DL configuration information from SIB1 because SIB1 is changed whenever there is a reconfiguration or RRC signaling message. To ensure that UEs in DRX and UEs that may have missed a reconfiguration transmission receive reconfiguration information, the eNB may resend the reconfiguration command periodically even if the UL/DL configuration has not changed.

Figure 12:
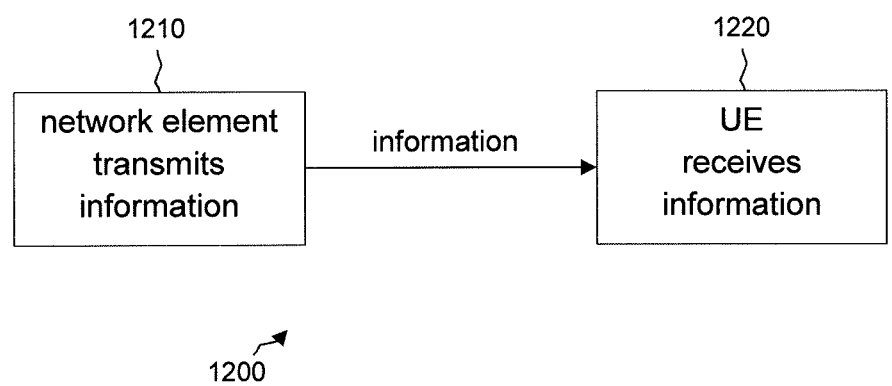
FIG. 12 illustrates a method for communication in a wireless telecommunication system according to an embodiment of the disclosure.

FIG. 12 illustrates an embodiment of a method 1200 for communication in a wireless telecommunication system. At block 1210, a network element, such as an eNB, transmits, in at least one of a MAC-based component or a DCI-based component, information regarding a configuration of uplink subframes and downlink subframes in a radio frame. At block 1220, a UE receives the information and takes appropriate action with the information.

Figure 13:
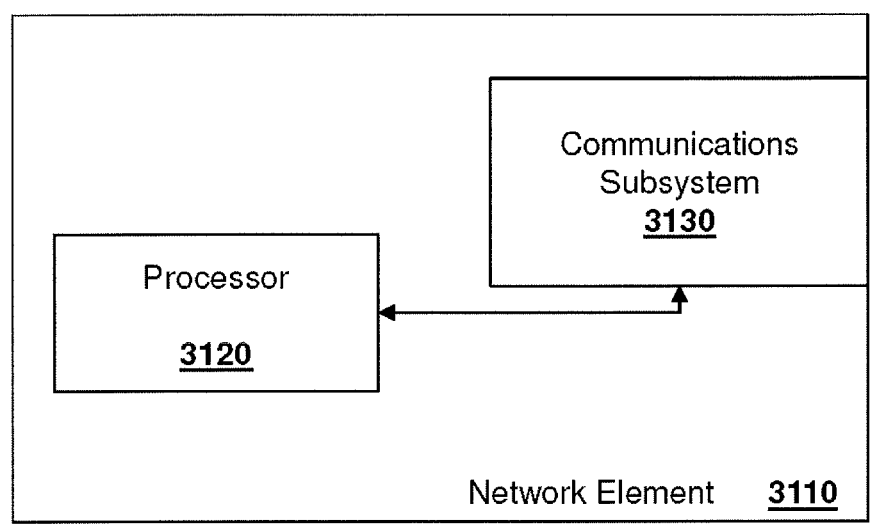
FIG. 13 is a simplified block diagram of an exemplary network element according to one embodiment.

The above may be implemented by a network element. A simplified network element is shown with regard to FIG. 13. In FIG. 13, network element 3110 includes a processor 3120 and a communications subsystem 3130, where the processor 3120 and communications subsystem 3130 cooperate to perform the methods described above.

Figure 14:
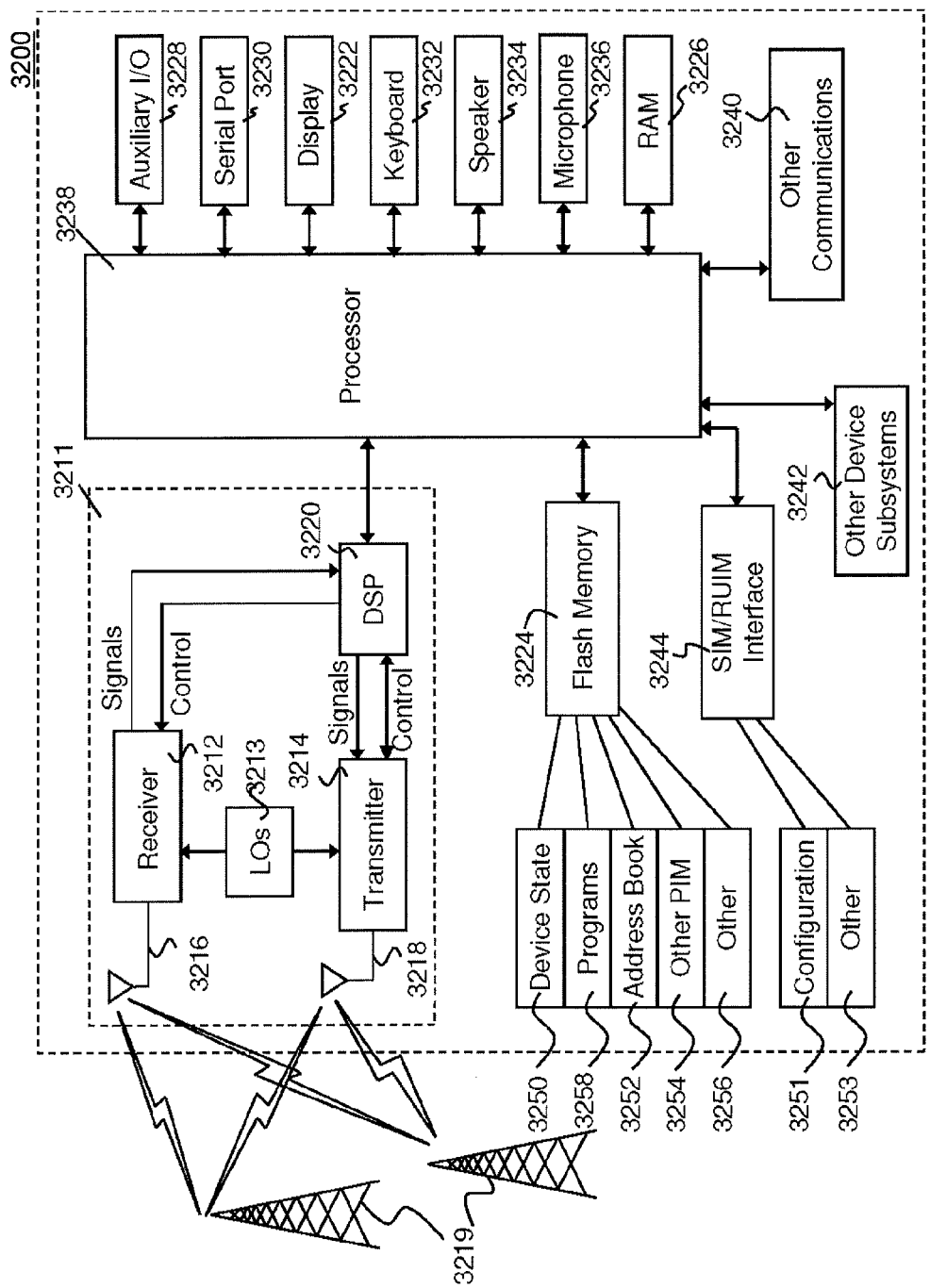
FIG. 14 is a block diagram of an example user equipment capable of being used with the systems and methods in the embodiments described herein.

Further, the above may be implemented by a UE. An example of a UE is described below with regard to FIG. 14. UE 3200 may comprise a two-way wireless communication device having voice and data communication capabilities. In some embodiments, voice communication capabilities are optional. The UE 3200 generally has the capability to communicate with other computer systems on the Internet. Depending on the exact functionality provided, the UE 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network in which the UE 3200 is intended to operate.

Network access requirements may also vary depending upon the type of network 3219. In some networks, network access is associated with a subscriber or user of the UE 3200. The UE 3200 may require a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When required network registration or activation procedures have been completed, the UE 3200 may send and receive communication signals over the network 3219. As illustrated, the network 3219 may consist of multiple base stations communicating with the UE 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be segregated into different areas for both computer programs 3258 and program data storage 3250, 3252, 3254 and 3256. These different storage types indicate that each program may allocate a portion of flash memory 3224 for their own data storage requirements. Processor 3238, in addition to its operating system functions, may enable execution of software applications on the UE 3200. A predetermined set of applications that control basic operations, including at least data and voice communication applications for example, may typically be installed on the UE 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the UE 3200 such as, but not limited to, e-mail, calendar events, voice mails, appointments, and task items. One or more memory stores may be available on the UE 3200 to facilitate storage of PIM data items. Such a PIM application may have the ability to send and receive data items via the wireless network 3219. Further applications may also be loaded onto the UE 3200 through the network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the UE 3200 and may provide enhanced on-device functions, communication-related functions, or both. For example, secure communication applications may enable electronic commerce functions and other such financial transactions to be performed using the UE 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of the UE 3200 may also compose data items, such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the UE 3200 is similar, except that received signals may typically be output to a speaker 3234 and signals for transmission may be generated by a microphone 3236. Alternative voice or audio I/O subsystems, such as a voice message recording subsystem, may also be implemented on the UE 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the UE 3200 by providing for information or software downloads to the UE 3200 other than through a wireless communication network. The alternate download path may, for example, be used to load an encryption key onto the UE 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi, WiMAX, near field communication (NFC), and/or radio frequency identification (RFID). The other communications element 3240 may also be used to communicate with auxiliary devices such as tablet displays, keyboards or projectors.

Figure 15:
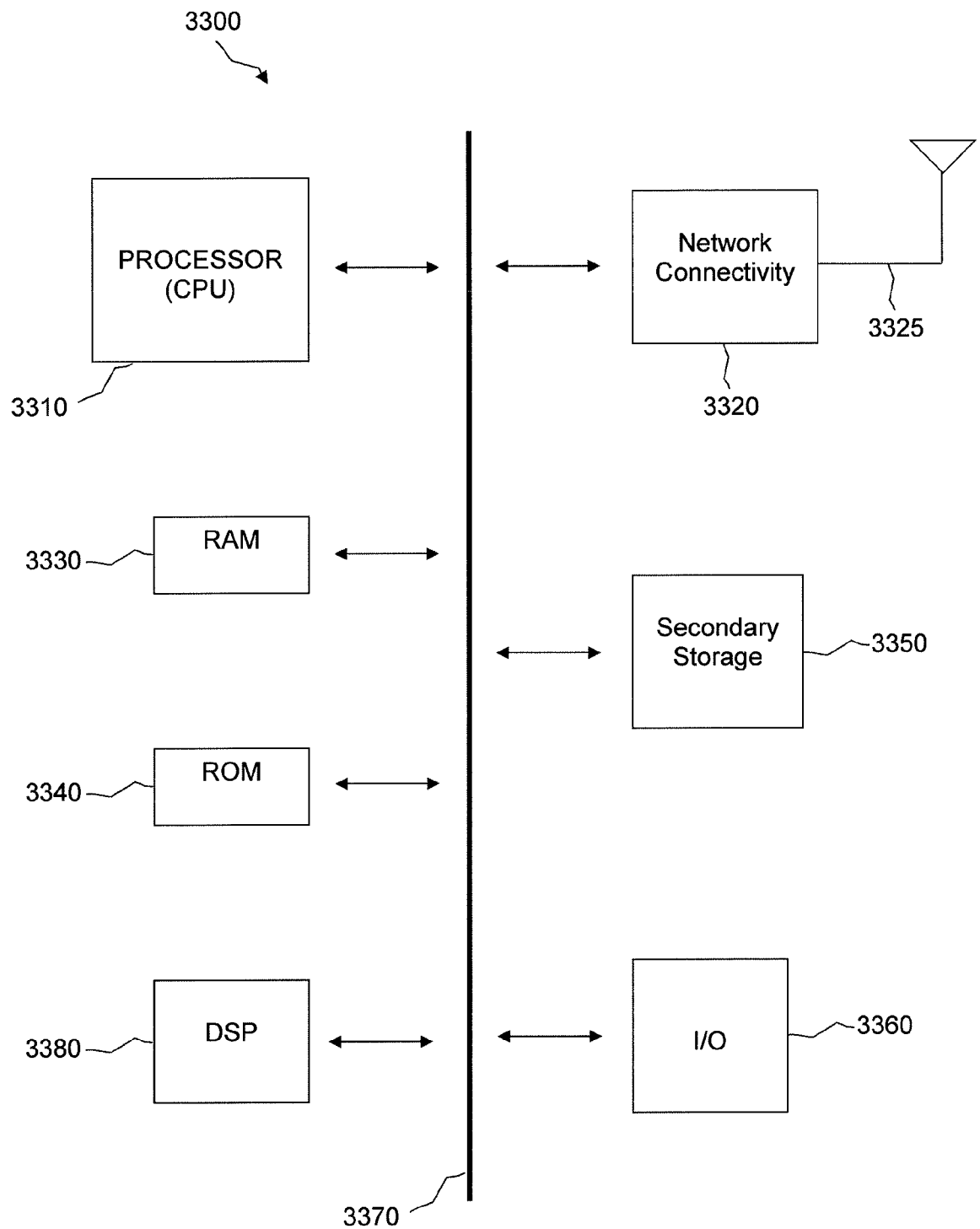
FIG. 15 illustrates a processor and related components suitable for implementing the several embodiments of the present disclosure.

The UE and other components described above might include a processing component that is capable of executing instructions related to the actions described above. FIG. 15 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The following are incorporated herein by reference for all purposes: 3GPP TS 36.211, 3GPP TS 36.212, and 3GPP TS 36.331.

In an embodiment, a method for communication in a wireless telecommunication system is provided. The method comprises transmitting, by a network element, in at least one of a MAC-based component or a DCI-based component, information regarding a configuration of uplink subframes and downlink subframes in a radio frame.

In another embodiment, a UE is provided. The UE comprises a processor configured such that the UE receives, in at least one of a MAC-based component or a DCI-based component, information regarding a configuration of uplink subframes and downlink subframes in a radio frame.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunication system, the method comprising:
    transmitting, by a network element, in at least one of a medium access control (MAC)-based component or a downlink control information (DCI)-based component, information regarding a configuration of uplink subframes and downlink subframes in a radio frame; and
    wherein the MAC-based component or DCI-based component comprises a sub-header portion and payload portion, and wherein the sub-header portion includes a type field specifying a type of configuration indicator in the payload portion, and wherein the configuration indicator specifies the configuration of uplink subframes and downlink subframes.

2. The method of claim 1, wherein, when a MAC-based component is transmitted, the MAC-based component is one of:
    a MAC protocol data unit (PDU); or
    a MAC control element (CE).

3. The method of claim 2, wherein, when the MAC-based component is a MAC PDU, the MAC PDU is identified by a radio network temporary identifier.

4. The method of claim 3, wherein the MAC PDU is transmitted only in subframes designated strictly for downlink transmissions.

5. The method of claim 2, wherein, when the MAC-based component is a MAC CE, the MAC CE is identified by a logical channel identifier.

6. The method of claim 1, wherein the type field specifies that the configuration indicator is a direct indicator, and wherein the configuration indicator includes a plurality of bits mapped to one of a plurality of configurations of uplink subframes and downlink subframes in a table of configurations of uplink subframes and downlink subframes.

7. The method of claim 1, wherein the type field specifies that the configuration indicator is a relative indicator, and wherein the configuration indicator includes a bit indicating a direction of movement from a current configuration to an adjacent configuration in a table of configurations of uplink subframes and downlink subframes.

8. The method of claim 7, wherein the table is divided into two groups based on downlink-to-uplink switch-point periodicity, and wherein the movement occurs within one of the groups.

9. The method of claim 1, wherein transmitting the MAC-based component comprises at least one of:
    transmitting the MAC-based component with a low modulation and coding scheme (MCS);
    transmitting the MAC-based component with a high MCS and repeating transmission of the MAC-based component at least once;
    repeating transmission of the MAC-based component upon receiving a negative acknowledgement regarding reception of the MAC-based component;
    periodically repeating transmission of the MAC-based component using hybrid automatic repeat request (HARQ) redundancy; or
    repeating transmission of the MAC-based component under control of a parameter in a radio resource control message.

10. The method of claim 2, wherein the MAC CE is multiplexed with other MAC-based data and transmitted on a physical downlink shared channel (PDSCH).

11. The method of claim 1, wherein, when a DCI-based component is transmitted, the DCI-based component conforms to one of:
    a first DCI format specified in Third Generation Partnership Project (3GPP) Technical Specification (TS) 36.212; or
    a second DCI format differentiated from the first DCI format based on a radio network temporary identifier.

12. The method of claim 11, wherein, when the DCI-based component conforms to the first DCI format, the DCI-based component is added into all DCI formats specified in 3GPP TS 36.212.

13. The method of claim 11, wherein, when the DCI-based component conforms to the first DCI format, the DCI-based component is added only into DCI formats designated for UE-specific downlink control information.

14. The method of claim 11, wherein, when the DCI-based component conforms to the second DCI format, the DCI-based component has a length that is the same as the length used for DCI formats 0/1A or 1C.

15. The method of claim 1, wherein the type field specifies that the configuration indicator is a direct indicator, and wherein the configuration indicator includes a plurality of bits mapped to one of a plurality of configurations of uplink subframes and downlink subframes in a table of configurations of uplink subframes and downlink subframes.

16. The method of claim 1, wherein the type field specifies that the configuration indicator is a relative indicator, and wherein the configuration indicator includes a bit indicating a direction of movement from a current configuration to an adjacent configuration in a table of configurations of uplink subframes and downlink subframes.

17. The method of claim 16, wherein the table is divided into two groups based on downlink-to-uplink switch-point periodicity, and wherein the movement occurs within one of the groups.

18. The method of claim 1, wherein sounding reference signal (SRS) transmissions are configured to occur in subframes that remain uplink subframes after the configuration of uplink subframes and downlink subframes has changed.

19. The method of claim 1, wherein downlink measurements are configured to occur only in subframes that are downlink subframes or special subframes in all subframe configurations.

20. The method of claim 1, wherein subframes that change between uplink subframes and downlink subframes in different subframe configurations are configured to be multicast/broadcast single frequency network (MBSFN) subframes.

21. A user equipment (UE) comprising:
   a processor configured such that the UE receives, in at least one of a medium access control (MAC)-based component or a downlink control information (DCI)-based component, information regarding a configuration of uplink subframes and downlink subframes in a radio frame; and
   wherein the MAC-based component or DCI-based component comprises a sub-header portion and payload portion, and wherein the sub-header portion includes a type field specifying a type of configuration indicator in the payload portion, and wherein the configuration indicator specifies the configuration of uplink subframes and downlink subframes.

22. The UE of claim 21, wherein the MAC-based component is one of:
   a MAC protocol data unit (PDU); or
   a MAC control element (CE).

23. The UE of claim 22, wherein, when the MAC-based component is a MAC PDU, the MAC PDU is identified by a radio network temporary identifier.

24. The UE of claim 22, wherein, when the MAC-based component is a MAC CE, the MAC CE is identified by a logical channel identifier.

25. The UE of claim 21, wherein the DCI-based component conforms to one of:
   a first DCI format specified in Third Generation Partnership Project (3GPP) Technical Specification (TS) 36.212; or
   a second DCI format differentiated from the first DCI format based on a radio network temporary identifier.

26. The UE of claim 25, wherein, when the DCI-based component conforms to the first DCI format, the DCI-based component is added into all DCI formats specified in 3GPP TS 36.212.

27. The UE of claim 25, wherein, when the DCI-based component conforms to the first DCI format, the DCI-based component is added only into DCI formats designated for UE-specific downlink control information.

28. The UE of claim 25, wherein, when the DCI-based component conforms to the second DCI format, the DCI-based component has a length that is the same as the length used for DCI formats 0/1A or 1C.

29. The UE of claim 21, wherein the type field specifies that the configuration indicator is a direct indicator, and wherein the configuration indicator includes a plurality of bits mapped to one of a plurality of configurations of uplink subframes and downlink subframes in a table of configurations of uplink subframes and downlink subframes.

30. The UE of claim 21, wherein the type field specifies that the configuration indicator is a relative indicator, and wherein the configuration indicator includes a bit indicating a direction of movement from a current configuration to an adjacent configuration in a table of configurations of uplink subframes and downlink subframes.

31. The UE of claim 30, wherein the table is divided into two groups based on downlink-to-uplink switch-point periodicity, and wherein the movement occurs within one of the groups.

* * * * *